UNITED STATES PATENT OFFICE.

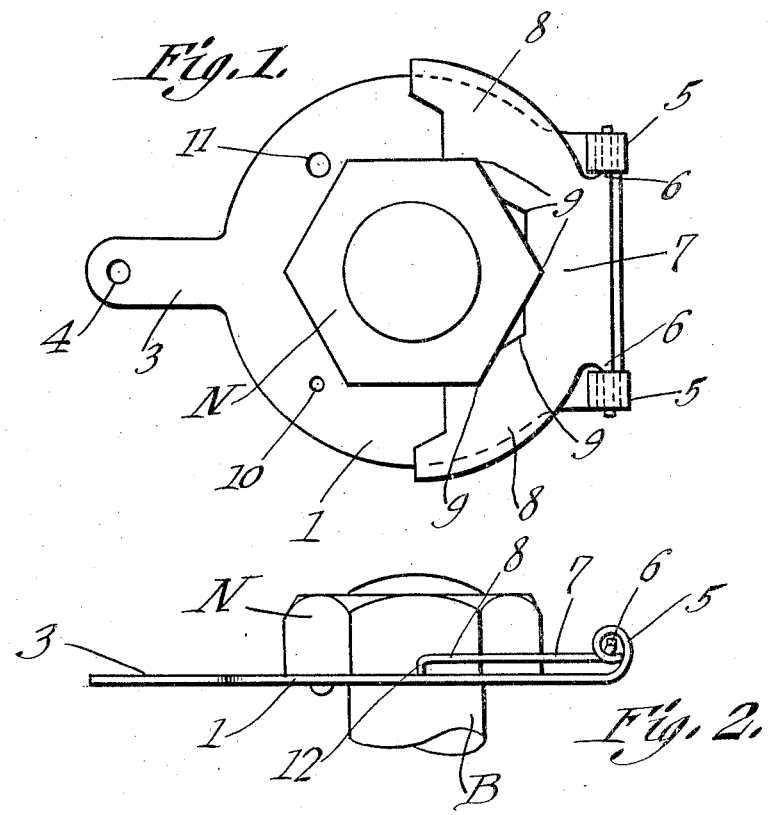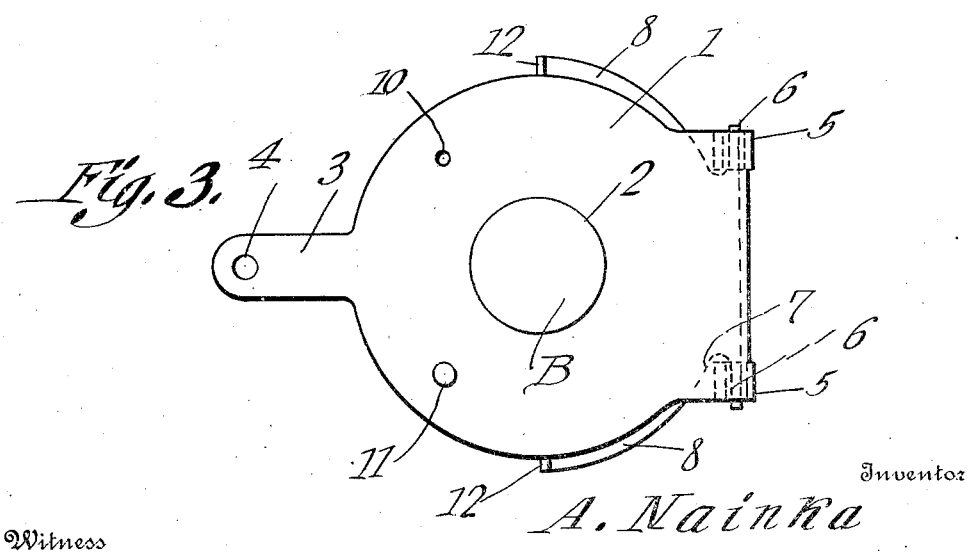

ANTHONY NAINKA, OF JANESVILLE, WISCONSIN.

NUT-LOCK.

1,332,268. Specification of Letters Patent. Patented Mar. 2, 1920.

Application filed October 27, 1919. Serial No. 333,725.

*To all whom it may concern:*

Be it known that I, ANTHONY NAINKA, a citizen of the United States, residing at Janesville, in the county of Rock and State of Wisconsin, have invented a new and useful Nut-Lock, of which the following is a specification.

This invention relates to nut locks and one of its objects is to provide a device of this character which can be used as an efficient means for holding nuts of different shapes and sizes against accidental rotation on the bolts to which they are applied, it being possible readily to unscrew the engaged nut or bolt whenever desired.

A further object is to provide a device of this character which is simple in construction and has means whereby it can be applied conveniently to different structures and held against movement thereon.

With the foregoing and other objects in view which will appear as the description proceeds, the invention consists of certain novel details of construction and combinations of parts which will be hereinafter more fully described and pointed out in the claim it being understood that various changes may be made in the construction and arrangement of the parts without departing from the spirit or sacrificing any of the advantages of the invention as set forth in the appended claim.

In the accompanying drawings the preferred form of the invention has been shown.

In said drawings—

Figure 1 is a plan view of the device showing a nut in position thereon.

Fig. 2 is a side elevation.

Fig. 3 is a bottom plan view, the bolt being shown in section.

Referring to the figures by characters of reference, 1 designates a base washer of sheet metal having a bolt receiving opening 2 and also provided with a radially extending tongue 3, having an opening 4 in the end portion thereof. Ears 5 extend from the opposite portion of the washer and are curled upwardly to form bearings for lugs 6 extending from opposite sides of a locking plate 7. This plate is likewise formed preferably of sheet metal and has oppositely curved diverging wings 8 the inner edges of which are formed with angular notches, as shown at 9. An opening 10 is formed in the washer 1 and said washer is also provided with a small depression 11 stamped thereinto.

In using the device herein described, the plate 7 is swung back and the washer placed on a bolt B. The nut N or, under some conditions the head of the bolt, will thus rest on the washer and the plate 7 can be swung toward the nut and washer so that the nut will be engaged and seated in certain of the notches 9 and thus held against rotation relative to the washer. The plate 7 will be kept in position by frictional engagement with the nut. The washer will, under some conditions, be held against rotation by the depressed portion 11 engaging the backing of the washer. Under other conditions a pin can be driven through the opening 10 and into the backing. Under still different conditions the tongue 3 can be bent over the edge of the backing. The free ends of the wings 8 are offset as at 12 thus to form spacing lugs. By forcing the wings out of frictional engagement with the nut said nut can be removed.

What is claimed is:—

A nut lock including a base washer, a radial bendable tongue extending therefrom, curled ears extending from the opposite portion of the washer, a locking plate, lugs thereon extending into the ears to form a hinge connection between the plate and washer, and diverging wings extending from the plate and having angular notches for receiving and frictionally engaging corner portions of a nut.

In testimony that I claim the foregoing as my own, I have hereto affixed my signature in the presence of two witnesses.

ANTHONY NAINKA.

Witnesses:
R. T. GLASSCO,
ARTHUR M. CHURCH.